United States Patent

Frantz et al.

[11] Patent Number: 5,225,674
[45] Date of Patent: Jul. 6, 1993

[54] METHOD OF DELINEATING NATURALLY FRACTURED INTERVALS IN SUBTERRANEAN FORMATIONS

[75] Inventors: Joseph H. Frantz, Pittsburgh, Pa.; Alfred Brown, Houston, Tex.; Richard A. Deans, Stamford, Conn.

[73] Assignee: Texaco Inc., White Plains, N.Y.

[21] Appl. No.: 822,789

[22] Filed: Jan. 21, 1992

[51] Int. Cl.⁵ ............................................. G01V 5/04
[52] U.S. Cl. ............................................ 250/260; 250/259
[58] Field of Search ................................ 250/259, 260

[56] References Cited

U.S. PATENT DOCUMENTS 3,129,331  4/1964  Bourne, Jr. et al. ................ 250/260
4,178,506  12/1979  Fertl .................................... 250/260
4,939,361  7/1990  Smith, Jr. ............................ 250/260

Primary Examiner—Carolyn E. Fields
Attorney, Agent, or Firm—James L. Bailey; Jack H. Park; Ronald G. Gillespie

[57] ABSTRACT

A potassium salt which is soluble either in water or in an oil-based drilling mud is forced via filtrate invasion into permeable subsurface formation zones adjacent a well borehole via an over-balanced drilling mud or completion system. Well logging is then performed in an interval of interest in the formations using natural gamma ray spectrometry. Gamma radiation at an energy of 1.46 MeV from the naturally occurring radioactive potassium isotope $^{40}K$ is detected. Gamma radiation levels of the isotope $^{40}K$ above normal background readings indicate the presence of permeable formations.

11 Claims, 1 Drawing Sheet

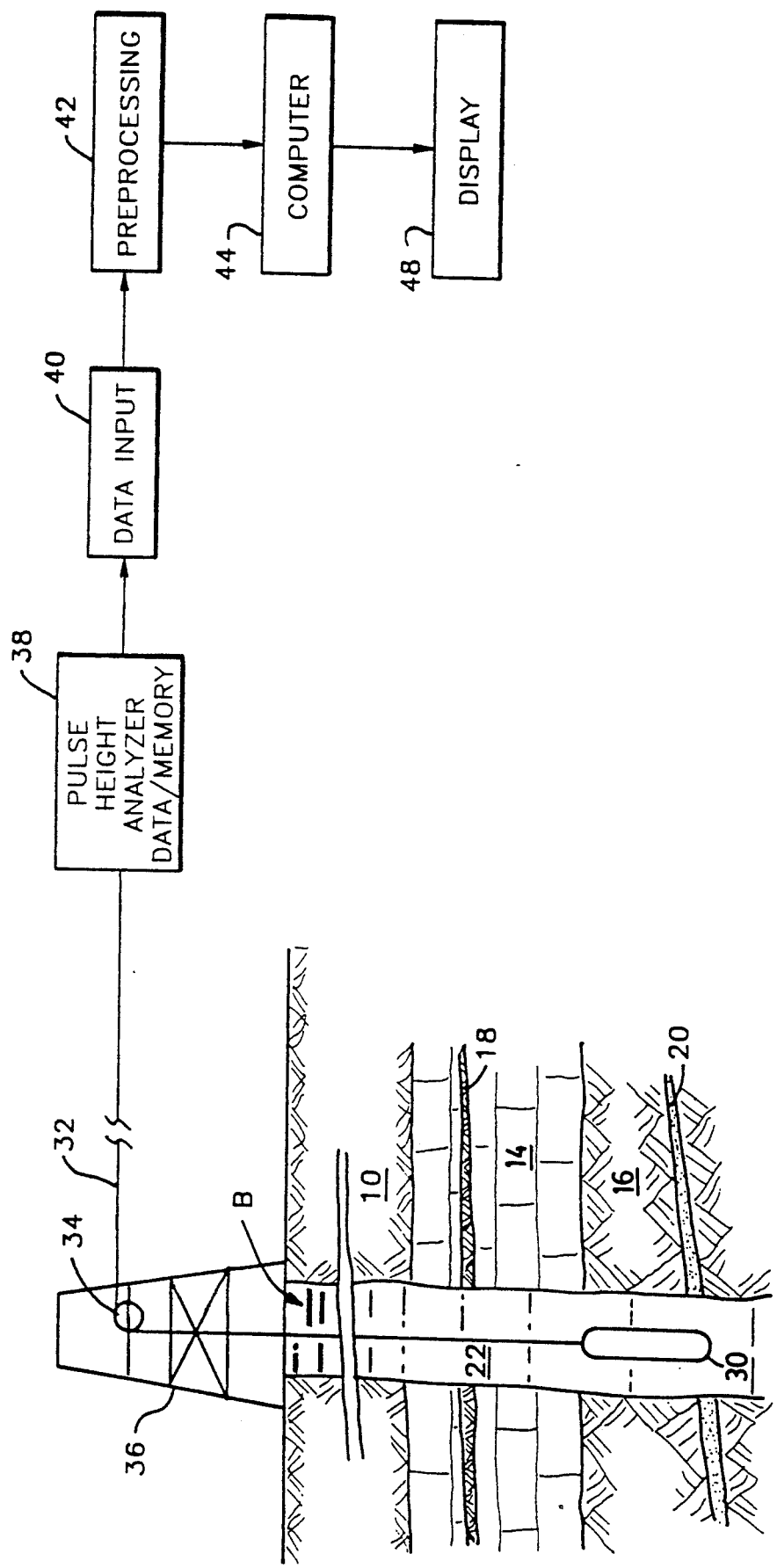

METHOD OF DELINEATING NATURALLY FRACTURED INTERVALS IN SUBTERRANEAN FORMATIONS

BACKGROUND OF THE INVENTION

1. Field of Invention

The present invention relates to radioactive logging of subsurface well formations of interest.

2. Description of Prior Art

In petroleum exploration and production, it has been very helpful to determine permeable intervals or zones in what were otherwise unproductive formations. Those of particular interest were naturally fractured intervals in shale, carbonate or sandstone reservoirs. These naturally fractured zones were typically the primary productive intervals in the formations of interest. Where the formation was an impermeable rock a naturally fractured zone if located could be a source of high oil or gas yield. One type of exploration drilling where location of such a zone would be particularly beneficial, and in which there has arisen considerable interest, would be that of horizontal drilling.

Permeability might be in the form of natural fractures or in the form of sharp contrasts, as where a thin sandstone formation was present within a thick shale sequence. A naturally fractured zone or zones might be only a small percentage of an overall interval under investigation. Discontinuous gas sands have occurred as relatively thin (five to twenty feet) channel type deposits within a thick shale package. Open hole well logs have been run in attempts to locate these areas of interest. So far as is known, these types of naturally fractured zones have been difficult to detect or delineate with known open hole well logs.

SUMMARY OF INVENTION

Briefly, the present invention provides a new and improved method of logging subsurface formations adjacent a well borehole to determine permeable zones in the formation. The permeable zone may be a naturally fractured zone in an impermeable rock, such as marble, or it may be a thin producing sand or sands in a thick deposit of shale or the like.

Potassium, which contains the naturally occurring radioactive isotope $^{40}K$, is introduced into the well borehole fluid, which may be water or an oil based drill mud. The potassium is usually a potassium salt, such as potassium chloride or potassium iodide. The potassium containing well borehole fluid is then forced via filtrate invasion into any permeable formation zones, such as by an over-balanced drilling mud or completion system.

A well logging sonde containing a gamma ray detector, a natural gamma ray spectrometer, is then lowered into the well borehole adjacent the formation zones of interest. Gamma radiation at an energy level of 1.46 MeV from the radioactive isotope $^{40}K$ is detected at various depths of interest in the well borehole. The presence of gamma radiation levels in this energy range above normal background radiation levels indicates the presence of permeable zones in the formation.

The present invention may be performed in either an uncased or a cased well borehole. When used in a cased well borehole which has several perforations in a zone of interest, the present invention may be used to determine which of the perforations have fluid flows through them.

BRIEF DESCRIPTION OF THE DRAWINGS

The single FIGURE of the drawings is a schematic view, taken partly in cross-section, of a well logging operation in subsurface formations adjacent a well bore.

DESCRIPTION OF PREFERRED EMBODIMENT

In the drawings, a well borehole B is shown penetrating a number of subsurface formations, such as 10, 14, and 16. In certain areas, reservoir formations such as 14 may be of a relatively impermeable stone so that little, if any, petroleum production is possible. Such a relatively impermeable stone may range from an unfractured marble from which petroleum production is virtually nil, to a shale, carbonate or sandstone.

However, it is common for there to exist in such relatively impermeable stone formations naturally fractures zoned such as indicated at 18. These naturally fractured zones are caused by tectonic movement which shatters the relatively impermeable formation rock and therefore renders the zones relatively permeable. Usually, a naturally fractured zone 18 where present represents only a small percentage of the overall interval or formation 14.

Another reservoir formation of interest for petroleum exploration and production which may occur is indicated as a discontinuous gas sand or sands 20 in an otherwise relatively impermeable formation 16. Such a sand or sands typically represent a channel type deposit which, although having a sharp contrast in permeability, is relatively thin. A typical example is a sand of from five to twenty feet within a relatively thick shale package or formation, such as at formation 16.

As is conventional during petroleum exploration and production, the borehole B is filled with a fluid or mud 22, usually either water or an oil-based drilling mud. According to the present invention, potassium which contains the naturally occurring radioactive isotope $^{40}K$ is introduced into the fluid 22. Potassium has three natural isotopes: $^{39}K$, $^{40}K$, and $^{41}K$. Of these isotopes, only the isotope $^{40}K$ is radioactive, being present in a proportion of about 0.0199% to the other two naturally occurring isotopes. Radioactive isotope $^{40}K$ has a half-life of about $1.25 \times 10^9$ years, emitting gamma radiation at a single energy level of 1.46 MeV.

The potassium introduced into the fluid 22 in the borehole B is a potassium salt soluble in either water or an oil-based drilling mud. Examples are potassium chloride and potassium iodide. In fact, some drilling muds are known to contain potassium chloride.

Typically, a potassium chloride or potassium iodide water-based mud system or workover fluid is utilized in accordance with the present invention. Where an oil-based drilling fluid system is used, a potassium salt of lipophilic surfactants is utilized. After the potassium chloride is in the drilling fluid in the borehole B, it is introduced into any permeable zones in the formations 10, 14, and 16.

Introduction of the potassium into the permeable zones is done by filtrate invasion from an overbalanced mud or completion system. This is accomplished by the conventional technique of increasing the hydrostatic pressure of the column of borehole fluid 22 to a level higher than that of the ambient fluid pressure in the formation of interest. Any permeable zones present in the formation under investigation are then penetrated by the potassium containing fluid so that the potassium salts remain in the permeable zones in the formation.

A well logging sonde 30 containing a natural gamma ray spectrometry system, such as that offered commercially by Schlumberger Well Services, is then lowered by a conductive wireline cable 32 into the wellbore B to obtain a record of natural gamma radiation levels in the borehole B and formations under investigation.

During the well logging runs, the sonde 30 and cable 32 are supported by a conventional sheave wheel 34, usually in a derrick 36. The gamma radiation well logging measurements obtained by the gamma ray spectrometry system in the sonde 30 are recorded and counted as functions of borehole depth in a suitable pulse height analyzer/data memory 38.

As has been set forth, the naturally occurring radioactive isotope $^{40}K$ emits gamma radiation at a single energy level of 1.46 MeV. Accordingly, gamma radiation is detected and counted for the purposes of the present invention in an MeV energy range or window which includes the 1.46 MeV energy level of $^{40}K$ gamma radiation. Such an MeV energy range or window is chosen so that it also does not encompass any other significant natural gamma radiation energy peaks from other elements in formation rock.

Once recorded, the natural gamma radiation well logging data measurements from the isotope $^{40}K$ may be transferred as needed into a data input unit 40 of a data processing system P. The well logging measurements so obtained are then subjected to conventional preprocessing in a preprocessing unit 42 and are transferred to a computer 44 for further processing. The processed results from the computer 44 are then available for analysis and display on a suitable display or plotter 48.

Where potassium has invaded the formation pore space, a higher gamma radiation signal intensity is present from that of naturally occurring potassium gamma rays. The presence of such a higher gamma radiation intensity in turn provides an indication of filtrate invasion of the formation and the presence of permeable zones in such formation.

Set forth below are several example field procedures during which the logging technique of the present invention may be implemented, either during drilling operations or during production operations.

DRILLING—EXAMPLE 1

1. The well is drilled with a normal drilling mud system to target depth.
2. An open hole log of the borehole B is performed with natural gamma ray spectrometry by sonde 30 to obtain a record of background gamma radiation readings from the isotope $^{40}K$ in the formation.
3. A wiping operation is then performed in the borehole B to remove mud cake from the formation walls adjacent the borehole. A slightly heavier drilling mud containing a potassium salt such as potassium chloride or potassium iodide is then circulated into the borehole B.
4. The sonde 30 is then lowered into the borehole B and an open-hole log is performed to record potassium filtrate invasion of any permeable zones in the formations.
5. The well borehole B is then cased by a conventional well casing operation, running in well casing and cement and using normal drilling mud or water as a displacement fluid during this operation.
6. The sonde 30 is then again lowered into the cased borehole B and a logging operation performed in order to record any difference between a cased-hole and an open-hole environment.

DRILLING—EXAMPLE 2

1. The borehole B is drilled to target depth with a potassium salt mud system containing either potassium chloride or potassium iodide.
2. The sonde 30 is then lowered into the borehole B and an open-hole natural gamma ray spectrometry log obtained to record potassium filtrate invasion of any permeable zones in the formation.
3. A wiping operation is then performed in the borehole B to remove mud cake from the formation walls adjacent the borehole.
4. A conventional drilling mud is then circulated into the borehole B and a second natural gamma ray spectrometry log again obtained with the sonde 30 to record gamma radiation from potassium filtrate invasion minus the contribution of borehole potassium to the gamma radiation log obtained during step 2 above.
5. The well borehole B is then cased by a conventional well casing operation, running in well casing and cement and using normal drilling mud or water as a displacement fluid during this operation.
6. The sonde 30 is then again lowered into the cased borehole B and a logging operation performed in order to record any difference between a cased-hole and an open-hole environment.

PRODUCTION—EXAMPLE 1

1. Circulate potassium salt fluid into a cased hole, perforated wellbore. A predetermined volume of fluid is then flowed into the wellbore (known in the art as a bullhead operation) to penetrate into the perforation at an established rate.
2. The flow rate is selected to be high enough to theoretically distribute fluid across all of the perforations in the casing in the interval or formation of interest. Further, the flow rate is selected to be at a rate below the formation fracturing rate.
3. The sonde 30 is lowered into the borehole B and a natural gamma ray spectrometry log performed to determine which of the perforations are accepting fluid and are thus exhibiting fluid flow.
4. The procedure set forth above could be used in situations where several hundred feet of a relatively impermeable formation are perforated in an attempt to locate and communicate with any naturally fractured intervals. The method of the present invention could be used to thus delineate the fractured versus non-fractured portion of the perforated zone in the formation.

It should be understood that the foregoing examples are by way of example and are in no way the only logging techniques to be performed according to the present invention. Numerous alternative implementation methods may be used as well.

The well logging process of the present invention can be implemented as a routine part of any drilling, completion or production procedure for a well. As such, it provides additional information concerning the productive potential of specific intervals within a wellbore. The results obtained according to the present invention can be utilized in conjunction with the normally available suite of open and cased-hole well logs to yield additional data from which operating decisions can be made, such as selecting perforation intervals in new wells or determining the presence of contributing perforations in older wells.

The logging techniques of the present invention can be used even during times when the potassium treated fluid remains in the borehole B during the logging run. The signal emanating from the well borehole B and the formation mud cake is filtered out so that it does not interfere with any signal produced by filtrate which has penetrated into permeable zones in the formations.

Having described the invention above, various modifications of the techniques, procedures, material and equipment will be apparent to those in the art. It is intended that all such variations within the scope and spirit of the appended claims be embraced thereby.

We claim:

1. A method of logging subsurface formations to determine permeable zones in the formations, comprising the steps of:
   drilling a borehole with a drilling mud system,
   running a first gamma ray log in the open borehole,
   wiping the borehole to remove caked mud,
   running a second gamma ray log in the open borehole,
   lining the borehole with a casing,
   providing a fluid containing a potassium salt into the borehole, and running a third gamma ray log in the cased borehole to determine the presence of permeable zones in the formations adjacent the borehole.

2. A method as described in claim 1 in which each gamma ray log includes a window for gamma radiation associated with an isotope $^{40}K$.

3. A method as described in claim 2 in which the window includes the 1.46 MeV energy level.

4. A method as described in claim 3 in which the providing step includes:
   providing the potassium salt containing fluid at a flow rate sufficiently higher enough to distribute fluid across all perforations in the casing.

5. A method as described in claim 4 in which the potassium salt is potassium chloride.

6. A method as described in claim 4 in which the potassium salt is potassium iodide.

7. A method of logging subsurface formations to determine permeable zones in the formations, comprising steps of:
   drilling a borehole using a potassium salt drilling mud system,
   running a first gamma ray log in the open borehole,
   wiping the borehole to remove caked mud,
   running a second gamma ray log in the open borehole,
   lining the borehole with casing using a fluid displacement that does not contain potassium fluid during the lining step, and
   running a third gamma ray log in the cased borehole to record any differences between gamma ray radiations in the cased borehole and in the open borehole.

8. A method as described in claim 7 in which each gamma ray log includes a window for gamma radiation associated with an isotope $^{40}K$.

9. A method as described in claim 8 in which the window includes the 1.46 MeV energy level.

10. A method as described in claim 9 in which the potassium salt is potassium chloride.

11. A method as described in claim 9 in which the potassium salt is potassium iodide.

* * * * *